(12) United States Patent
Kuo et al.

(10) Patent No.: US 7,565,564 B2
(45) Date of Patent: Jul. 21, 2009

(54) SWITCHING CIRCUIT AND METHOD THEREOF FOR DYNAMICALLY SWITCHING HOST CLOCK SIGNALS

(75) Inventors: Hung-Yi Kuo, Hsin-Tien (TW); Hui-Mei Chen, Hsin-Tien (TW); Weber Chuang, Hsin-Tien (TW)

(73) Assignee: Via Technologies Inc., Taipei (TW)

( * ) Notice: Subject to any disclaimer, the term of this patent is extended or adjusted under 35 U.S.C. 154(b) by 484 days.

(21) Appl. No.: 11/473,236

(22) Filed: Jun. 23, 2006

(65) Prior Publication Data

US 2007/0174649 A1    Jul. 26, 2007

(30) Foreign Application Priority Data

Jan. 26, 2006 (TW) .............................. 95103135 A

(51) Int. Cl.
 *G06F 1/00* (2006.01)
 *G06F 5/06* (2006.01)
 *H04L 7/00* (2006.01)
(52) U.S. Cl. ...................... 713/500; 713/600; 375/357
(58) Field of Classification Search .................. 713/500
See application file for complete search history.

(56) References Cited

U.S. PATENT DOCUMENTS

| | | | | |
|---|---|---|---|---|
| 4,229,699 A | * | 10/1980 | Frissell | 327/114 |
| 4,748,417 A | * | 5/1988 | Spengler | 327/99 |
| 4,855,616 A | * | 8/1989 | Wang et al. | 327/145 |
| 5,790,609 A | * | 8/1998 | Swoboda | 375/357 |
| 6,819,150 B1 | * | 11/2004 | Santosa et al. | 327/141 |
| 7,093,153 B1 | * | 8/2006 | Witek et al. | 713/600 |

* cited by examiner

*Primary Examiner*—Suresh K Suryawanshi
(74) *Attorney, Agent, or Firm*—Rosenberg, Klein & Lee

(57) ABSTRACT

A switching circuit located in a computer system is disclosed in the present invention. The switching circuit comprises a first phase-locked loop generating a first host clock signal, a second phase-locked loop generating a second host clock signal and an output switch unit coupled to the first PLL and the second PLL. When the computer system operates in a first mode, the output switch unit chooses the first host clock signal to be a fundamental clock signal of the front side bus. In the other hand, when the computer system operates in a second mode, the output switch unit chooses the second host clock signal to be a fundamental clock signal of the front side bus.

19 Claims, 4 Drawing Sheets

| Adjustment Signal (BSEL) | Host Clock Signal (MHz) |
|---|---|
| <0,0> | 100 |
| <0,1> | 133 |
| <1,0> | 166 |
| <1,1> | 200 |

Fig. 2

SWITCHING CIRCUIT AND METHOD THEREOF FOR DYNAMICALLY SWITCHING HOST CLOCK SIGNALS

FIELD OF THE INVENTION

The present invention relates generally to a switching circuit and method thereof, and particularly to a switching circuit and method for dynamically switching host clock signals of a computer in order to switch dynamically the operating frequency of the front side bus.

BACKGROUND OF THE INVENTION

With the rapid development of computer technologies, computers are popularized, bringing users great convenience. In particular, portable computers make users be able to handle business on the go. To meet users' needs, the processing speeds of current computers increase day by day. Increasing the processing speeds of computers can enhance the performance of the computers. However, relatively more power will be consumed. It is not a big issue for desktop computers. Nevertheless, for portable computers, because it will cause the portable computer consume the power of batteries, the using time of the portable computer will be affected. Thereby, how to reduce the power consumption of portable computers becomes an important challenge. In addition, when supplying external power to the portable computers, how to increase the processing speeds of the portable computers to provide users with higher using performance also becomes a significant challenge.

Nowadays, in order to solve the problem described above, the vendors of portable computers make the operating frequency of the front side bus, which is between the central processing unit (CPU) and system chip, adjustable by users so that the portable computers can save power when supplied by batteries. Because the operating frequency of the front side bus is determined by the host clock signal, which is the fundamental clock signal of the front side bus, generated by the clock generator, thereby adjusting the operating frequency of the front side bus can be achieved by adjusting the frequency of the host clock signal.

Currently, the adjustment method is changing the operating frequency of the front side bus by means of the Basic Input/Output System (BIOS) at computer startup. Substantially, the configuration of the clock generator is changed to generate the host clock signal and the computer is rebooted. Thereby, after the computer is rebooted, the clock generator will generate the host clock signal according to the new configuration to adjust the operating frequency of the front side bus. According to the above description, it is known that each time when the operating frequency of the front side bus is adjusted, the steps of shutting down and rebooting the computer has to be carried out repeatedly, which is relatively inconvenient to users.

Thereby, nowadays, in order to solve the problem described above, the vendors of portable computers make the operating frequency of the front side bus adjustable by users when the computer is in operation. However, when the front side bus is in operation, if the operating frequency of the front side bus is adjusted substantially, that is, the host clock signal is adjusted substantially, the normal operation of the front side bus will be affected, which in turn will cause the computer crashed easily. Consequently, currently the operating frequency of the front side bus can be adjusted in small ranges each time. For example, it can be adjusted by 1 MHz each time. Thereby, if the user needs to adjust the operating frequency substantially, it can only be achieved by repeated small-ranged adjustments, which is very inconvenient. Furthermore, such small-ranged adjustments achieve the purpose of adjustment by changing the configuration via system management bus. The process of such kind of adjustments is quite complex; thereby the adjustment efficiency is low.

Accordingly, the present invention provides a switching circuit and method thereof for dynamically switching host clock signals to solve the problems described above. The switching circuit and method thereof can switch the host clock signals substantially when the computer is in normal operation. That is, the fundamental clock signal of the front side bus is changed to adjust substantially the operating frequency of the front side bus. Thereby, the users can adjust conveniently so that the power consumption of portable computers can be reduced, or the processing performance of portable computers can be enhanced.

SUMMARY

The present invention provides a switching circuit and method thereof for dynamically switching host clock signals. The switching circuit and method thereof generate a new host clock signal in advance according to an adjustment signal, and when the CPU enters sleep state, in which the front side bus ceases to operate, switch the original host clock signal to the new host clock signal to replace the original host clock signal as the fundamental clock signal of the front side bus. Thereby, when the CPU quits the sleep state and the front side bus recovers operating, the purpose of dynamically adjusting the operating frequency of the front side bus can be achieved.

The present invention also provides a switching circuit and method thereof for dynamically switching host clock signals. The switching circuit and method thereof adjust the phase of the new host clock signal according to the phase of a fixed clock signal to achieve the purpose of stabilizing the adjustment of the operating frequency of the front side bus.

In order to make the structure and characteristics as well as the effectiveness of the present invention to be further understood and recognized, the detailed description of the present invention is provided as follows along with preferred embodiments and accompanying figures.

BRIEF DESCRIPTION OF THE DRAWINGS

FIG. 2 is a correspondence table between adjustment signals and host clock signals according to the present invention;

DETAILED DESCRIPTION

The switching circuit and method thereof for dynamically switching host clock signals according to the present invention generate a host clock signal to be used as the fundamental clock signal of the front side bus in advance, and when the CPU enters sleep state, in which the front side bus ceases to operate, switch the original host clock signal to the host clock signal generated in advance to replace the original host clock signal as the fundamental clock signal of the front side bus. Thereby, the purpose of dynamically adjusting substantially the operating frequency of the front side bus can be achieved.

Figure 1:
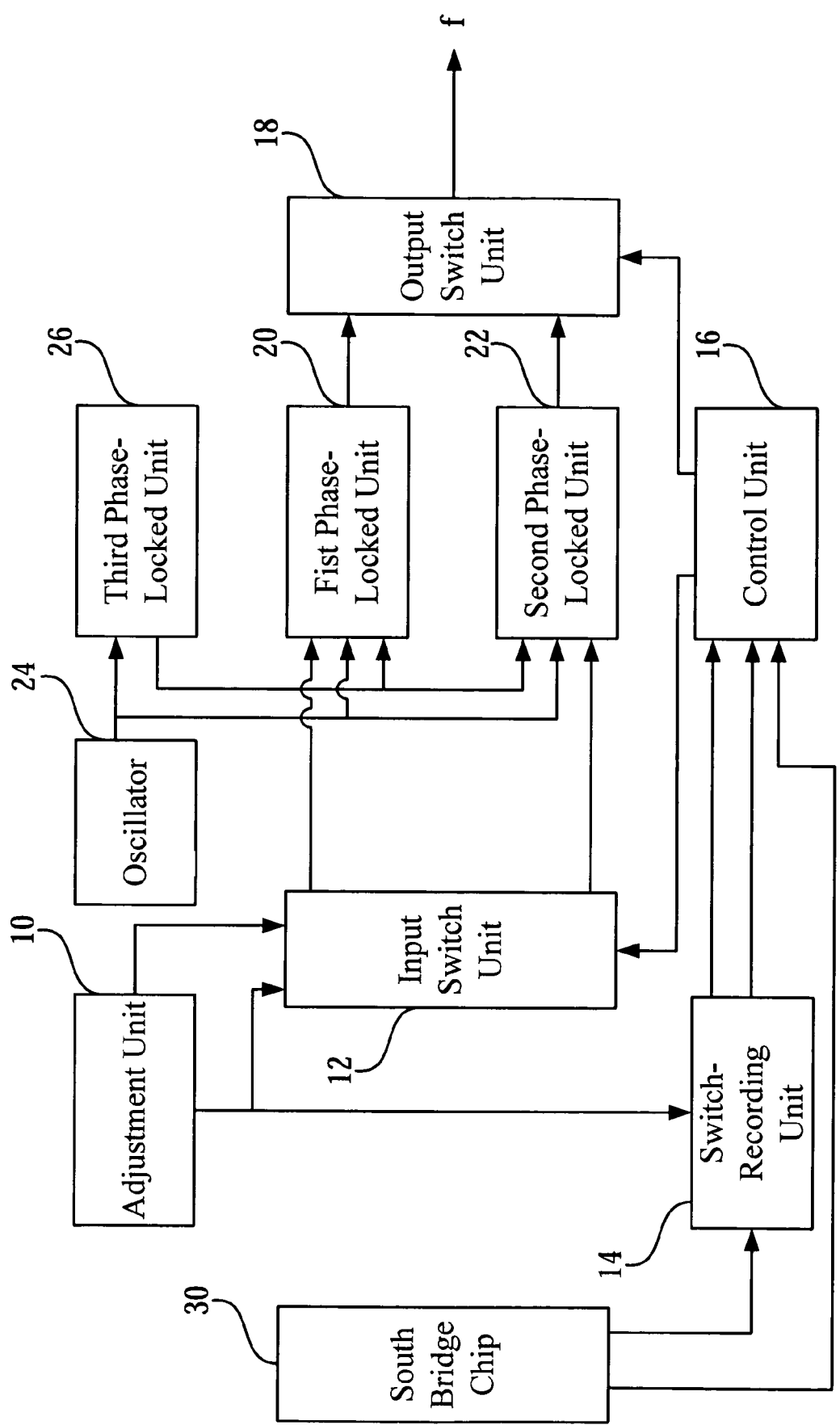
FIG. 1 is a block diagram according to a preferred embodiment of the present invention.

Please refer to FIG. 1, which is a block diagram according to a preferred embodiment of the present invention. As shown in the figure, the switching circuit according to the present invention comprises an adjustment unit 10, which is used to receive an external instruction by an user of the computer, who wishes to adjust the operating frequency of the front side bus, and to transmit correspondingly an adjustment signal to an input switch unit 12 and a switch-recording unit 14. Moreover, the adjustment unit 10 can also receive an internal instruction for adjusting the operating frequency of the front side bus transmitted by the computer system. That is, when current computer status is detected as low loading by the system inside the computer, it is allowed to transmit the internal instruction to the adjustment unit 10 to lower the operating frequency of the front side bus. In other words, a lower frequency of the host clock signal is used as the fundamental clock signal of the front side bus. The adjustment unit 10 can be a CPU of the computer, and the adjustment signal can be a bus select signal (BSEL). As shown in FIG. 2, each of the adjustment signals corresponds respectively to a host clock signal with a different frequency for being the fundamental clock signal of the front side bus so that the operating frequency of the front side bus can be adjusted.

Further, the switch-recording unit 14 receives the adjustment signal, and transmits a switch-recording signal to a control unit 16. The control unit 16 receives the switch-recording signal and a first control signal transmitted by a south bridge chip 30, and outputs a switch-triggering signal to the input switch unit 12 and an output switch unit 18. The first control signal is the signal used by the south bridge chip 30 for driving the CPU to enter the sleep state, for example, a C3 state of the Advanced Configuration and Power Interface (ACPI), in which state the front side bus ceases to operation. When the south bridge chip 30 transmits a second control signal used for driving the CPU to quit the sleep state and recover normal operation, the second control signal will also be transmitted to the switch-recording unit 14, making the switch-recoding unit 14 output a non-switch-recording signal to the control unit 16, and making the control unit 16 not to transmit the switch-triggering signal.

According to the received switch-triggering signal, the input switch unit 12 transmits the adjustment signal transmitted by the adjustment unit 10 to a first PLL 20 or a second PLL 22, wherein the input switch unit 12 can be a demultiplexer. The first PLL 20 receives a fundamental clock signal generated by an oscillator 24, and, according to a first adjustment signal received, generates a first host clock signal corresponding to the first adjustment signal. In addition, when the second PLL 22 receives a second adjustment signal, as described above, it will generate a second host clock signal corresponding to the second adjustment signal. In order to prevent computer instability caused by asynchronism between the phase of the host clock signal generated by the first PLL 20 and the second PLL 22, and the phase of other clock signals in the computer, the first PLL 20 and the second PLL 22 further receive a fixed clock signal generated by a third PLL 26. Thereby, the phases of the first host clock signal and the second clock signal can be adjusted according to the phase of the fixed clock signal. The third PLL 26 receives the fundamental clock signal of the oscillator 24, and generates the fixed clock signal. The first PLL 20, the second PLL 22, and the third PLL 26 can all be installed in a clock generator.

According to the switch-triggering signal transmitted by the control unit 16, the output switch unit 18 switches the first host clock signal or the second host clock signal to be the fundamental clock signal f of the front side bus, and transmits it to a north bridge chip. The north bridge chip, according to the fundamental clock signal f, generates the operating clock signal of the front side bus. The output switch unit 18 described above can be a multiplexer. The switching actions according to the present invention are carried out when the CPU enters the sleep state, in which state the front side bus ceases to operate. Consequently, the switching actions will not affect the normal operations of the front side bus. When the CPU quits the sleep state, the switching actions are all completed. Thereby, the adjustment of the operating frequency of the front side bus is finished, and the purposes of saving power or of enhancing the using performance of computers are achieved. Furthermore, the switching circuit can be installed in a clock generator.

A preferred embodiment according to the present invention is proposed for detailed description thereinafter. When the computer is turned on, by default, the adjustment unit 10 will transmit the first adjustment signal to the input switch unit 12, and the control unit 16 will transmit the switch-triggering signal to the input switch unit 12 and the output switch unit 18 such that the input switch unit 12 transmits the first adjustment signal to the first PLL 20 to generate the first host clock signal. The output switch unit 18, according to the received switch-triggering signal, will transmit the first host clock signal to be the initial fundamental clock signal of the front side bus after the computer is turned on. Assuming that the default first adjustment signal is BSEL <1, 0>, as shown in FIG. 2, the first PLL 20 will receive the fundamental clock signal of the oscillator 24 and the fixed clock signal of the third PLL 26. In addition, according to the first adjustment signal, the first PLL 20 will generate the first host clock signal with a frequency of 166 MHz for being the fundamental clock signal f of the front side bus.

After the computer is turned on for a proper period of time, that is, when the transmission of the first host clock to be the fundamental clock signal of the front side bus is carried out, the control unit 16, by default, outputs the switch-triggering signal to the input switch unit 12 for driving the input switch unit 12 to transmit the second adjustment signal, which is transmitted by the adjustment unit 10 thereafter to adjust the operating frequency of the front side bus. Furthermore, it is also possible to configure in advance a default value, which corresponds to the first adjustment signal, in the first PLL 20 such that after the computer is turned on, the first PLL 20 generates the first host clock signal according to the default value. Besides, the control unit 16 outputs the switch-triggering signal to the input switch unit 12 by default to transmit the second adjustment signal, which is transmitted by the adjustment unit 10 thereafter, to the second PLL 22.

When the adjustment unit 20 receives the external instruction or the internal instruction to adjust the operating frequency of the front side bus, it will transmit correspondingly the second adjustment signal to the input switch unit 12 and the switch-recording unit 14. Assuming that the second adjustment signal is BSEL<0, 0>, as shown in FIG. 2, the input switch unit 12 will transmit the second adjustment signal to the second PLL 22, and, corresponding to the second adjustment signal, the second PLL 22 will generate the second host clock signal with a frequency of 100 MHz. In addition, the switch-recording unit 14 will transmit a switch signal to the control unit 16 according to the second adjustment signal.

When the south bridge chip 30 transmits the first control signal to the CPU, driving the CPU to enter the sleep state, in which the front side bus ceases to operate, it will also transmit the first control signal to the control unit 16 so that the control unit 16 outputs the switch-triggering signal to the output switch unit 18 for switching the first host clock signal to the second host clock signal. In other words, the second host clock signal replaces the first host clock signal to be the fundamental clock signal f of the front side bus. Because at present, the front side bus is in the state of stopping transmission, the switching action will not affect the operation of the front side bus. Thereby, when the south bridge chip 30 transmits the second control signal to the CPU, driving the CPU to quit the sleep state and to recover normal operation, the adjustment of the operating frequency of the front side bus is completed. As described above, when the control unit 16 transmits the switch-triggering signal to the output switch unit 18, it will also transmit the switch-triggering signal to the input switch unit 12 so that the input switch unit 12 transmits the adjustment signal, which is transmitted again by the adjustment unit 10 thereafter, to the first PLL 20.

Furthermore, because the switch-recording unit 14 transmits the switch signal to the control unit 16 upon receiving the second adjustment signal, if the adjustment unit 10 doesn't transmit the adjustment signal and the south bridge chip 30 transmits the first control signal again for driving the CPU to enter the sleep state, the control unit 16 will be driven to transmit the switch-triggering signal again to the input switch unit 12 and the output switch unit 18, and thereby switch the second host clock signal to the first host clock signal, making the first host clock signal be the fundamental clock signal f. Consequently, false switch will result. In order to prevent the error described above from occurring, when the south bridge chip 30 transmits the second control signal for driving the CPU to quit the sleep state, it will also transmit the second control signal to the switch-recording unit 14 to make the switch-recording unit 14 transmit the non-switch-recording signal to the control unit 16. Thereby, the control unit 16 will not transmit the switch-triggering signal. Accordingly, the output switch unit 18 will not switch falsely when the adjustment unit 10 does not output the adjustment signal.

Moreover, when the adjustment unit 10 receives instructions again to adjust the operating frequency of the front side bus, the adjustment unit 10 will output a third adjustment signal to the input switch unit 12 and the switch-recording unit 14, and the input switch unit 12 will transmit the third adjustment signal to the first PLL 20. According to the third adjustment signal, the first PLL 20 generates a third host clock signal in advance, and the switch-recording unit 14 outputs the switch-recording signal to the control unit 16. At this time, the output switch unit 18 still maintains transmitting the second host clock signal until the south bridge chip 30 transmits the first control signal for driving the CPU to enter the sleep state, in which the front side bus ceases to operate. When the control unit 16 transmits the switch-triggering signal to the input switch unit 12 and the output switch unit 18, the output switch unit 18 will switch the second host clock signal to the third host clock signal, making the third host clock signal is the fundamental clock signal of the front side bus. When the south bridge chip 30 transmits the second control signal for driving the CPU to quit the sleep state, the adjustment of the operating frequency of the front side bus is completed. In addition, the switch-recording unit 14 will also transmit the non-switch-recording signal to the control unit 16 according to the second control signal to prevent the output switch unit 18 from false switch.

Figure 3:
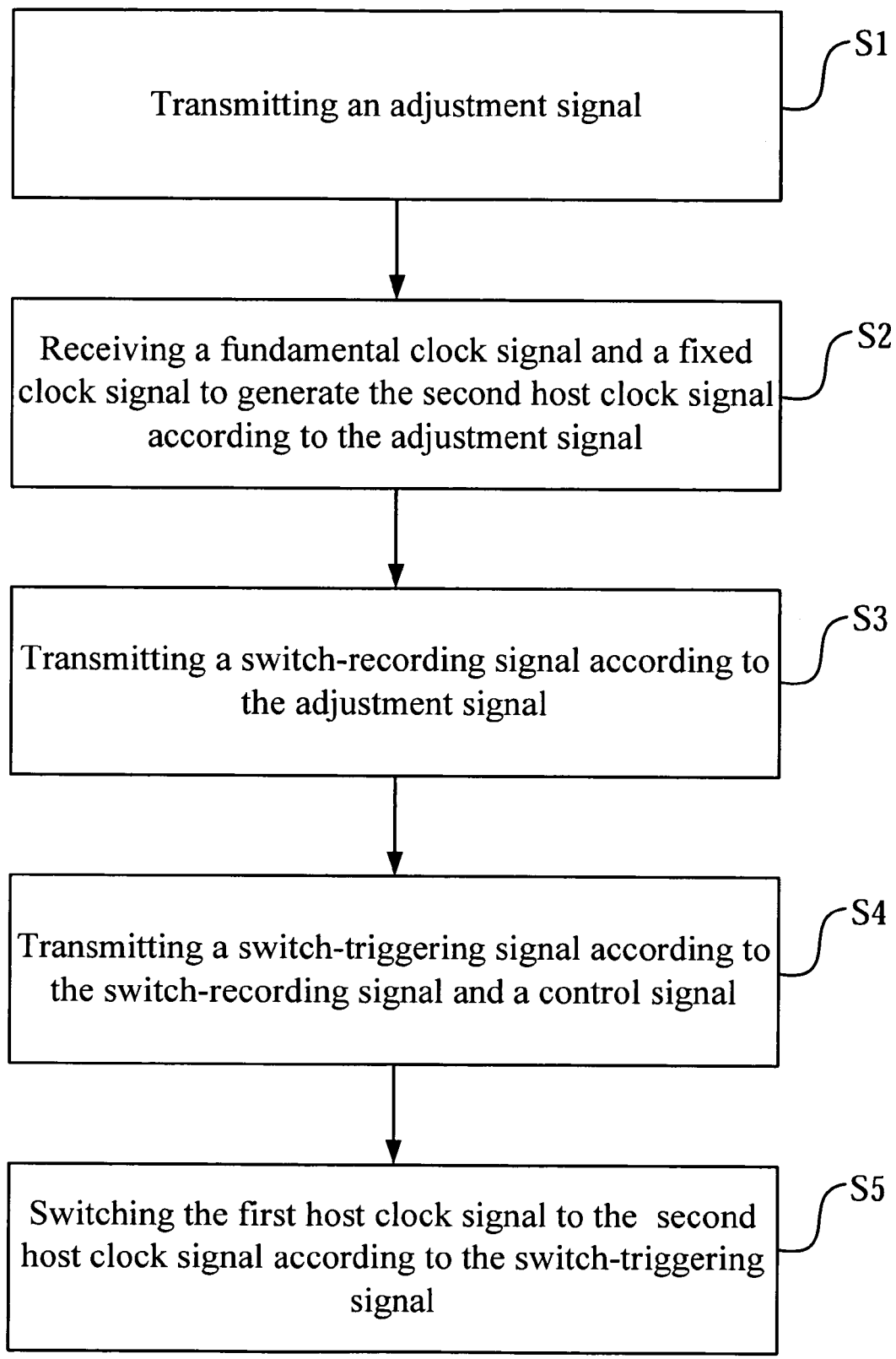
FIG. 3 is a flowchart according to a preferred embodiment of the present invention.

Please refer to FIG. 3, which is a flowchart according to a preferred embodiment of the present invention. After the computer is turned on, when the north bridge chip uses the first host clock signal as the fundamental clock signal of the front side bus, if the adjustment unit 10 receives the external instruction or the internal instruction to adjust the operating frequency of the front side bus, firstly the adjustment unit 10, as shown in the step S1, transmits the adjustment signal to the input switch unit 12 and the switch-recording unit 14. If this adjustment is the first adjustment after the computer is turned on, the adjustment unit 10 will transmit the second adjustment signal to the input switch unit 12 and the switch-recording unit 14, and the input switch unit 12 will transmit the second adjustment signal to the second PLL 22 immediately. Afterwards, the second PLL 22, as shown in the step S2, receives the fundamental clock signal generated by the oscillator 24 and the fixed clock signal generated by the third PLL 26 to generate the second host clock signal according to the received second adjustment signal. In addition, the switch-recording unit 14, as shown in the step S3, transmits the switch-recording signal to the control unit 16 according to the second adjustment signal.

To continue, the control unit 16, as shown in the step S4, transmits the switch-triggering signal to the input switch unit 12 and the output switch unit 18 according to the switch-recording signal and the first control signal transmitted by the south bridge chip 30 for driving the CPU to enter the sleep state. In the end, the output switch unit 18, as shown in the step S5, switches the first host clock signal to the second host clock signal for making the second host clock signal to be the fundamental clock signal of the front side bus according to the switch-triggering signal. Thereby, when the south bridge chip 30 transmits the second control signal for driving the CPU to quit the sleep state, the CPU will recover normal operation and finish the purpose of adjusting the operating frequency of the front side bus. At this time, the switch-recording unit 14 will receive the second control signal, and transmit the non-switch-recording signal to the control unit 16 to drive the control unit 16 not to output the switch-triggering signal.

Figure 4:
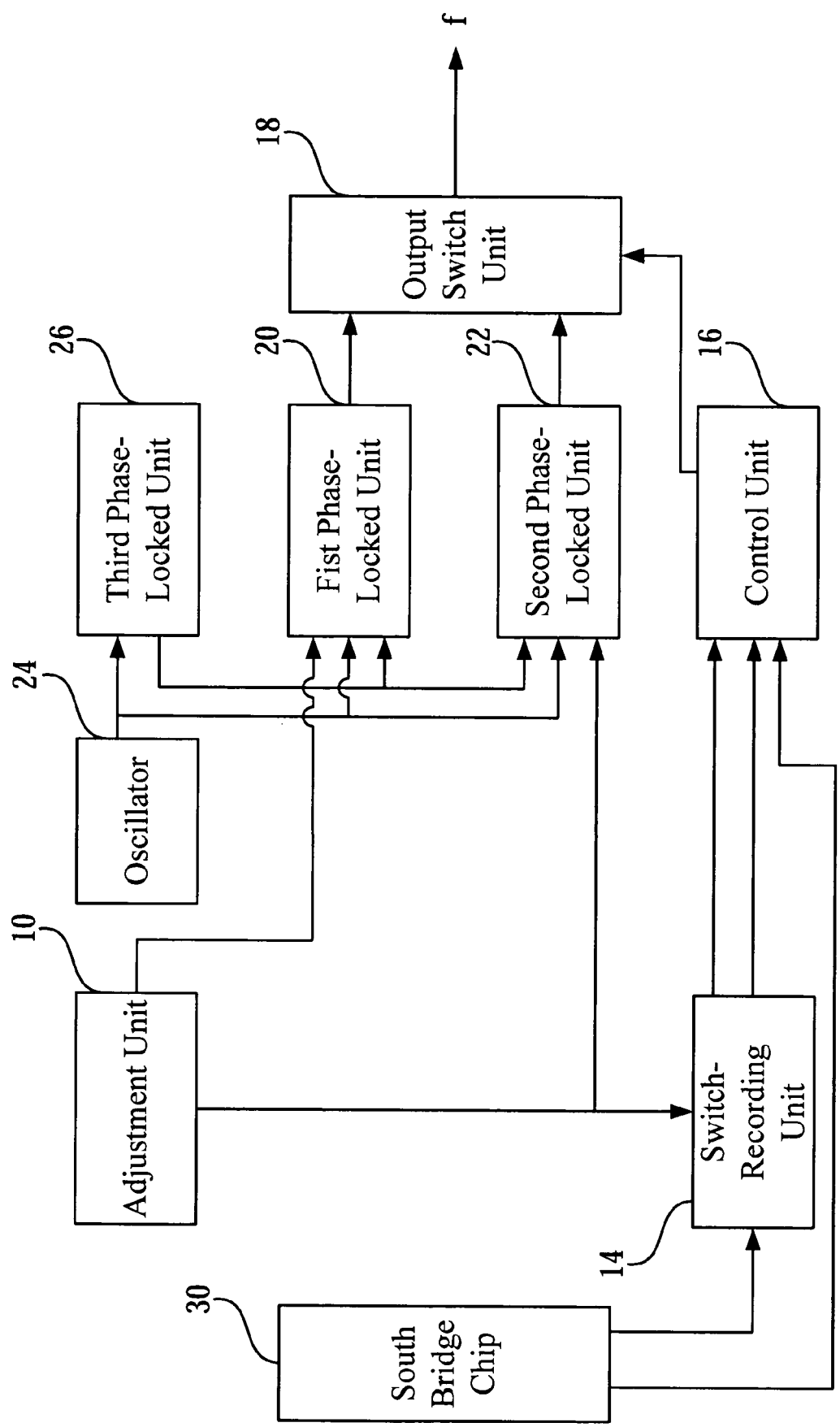
FIG. 4 is a block diagram according to another preferred embodiment of the present invention.

Please refer to FIG. 4, which is a block diagram according to another preferred embodiment of the present invention. As shown in the figure, the difference between the embodiments in FIG. 1 and FIG. 4 is that the input switch unit 12 is not included in the embodiment of FIG. 4. The adjustment unit 10 in the embodiment of FIG. 4 transmits the adjustment signals alternately to the first PLL 20 and the second PLL 22. That is to say, the adjustment unit 10 will transmit the first adjustment signal to the first PLL 22 in advance. If the adjustment unit 10 receives instructions to adjust the operating frequency of the front side bus, it will transmit the second adjustment signal to the second PLL 22. Afterwards, if the third adjustment signal is to be transmitted, the adjustment unit 10 will transmit the third adjustment signal to the first PLL 20. Thereby, by transmitting the adjustment signals alternately by the adjustment unit 10, it is not necessary to include the input switch unit 12, enhancing the efficiency of adjusting the operating frequency of the front side bus as well as saving costs.

To sum up, the switching circuit and method thereof for dynamically switching the host clock signals according to the present invention use mainly phase-locked loops to generate the desired host clock signal in advance. When the CPU enters the sleep state, in which the front side bus ceases to operated, the original host clock signal is switched to the host clock signal generated in advance for making the host clock signal generated in advance be the fundamental clock signal of the front side bus. When the CPU quits the sleep state, the adjustment of the operating frequency of the front side bus is completed. Thereby, the operating frequency of the front side bus can be switched and adjusted substantially without the need of rebooting the computer. That is, the operating frequency of the front side bus can be adjusted substantially and dynamically. Accordingly, the operating frequency of the computer can be adjusted depending on the using condition, reducing effectively power consumed by the computer or enhancing the processing performance of the computer.

Accordingly, the present invention conforms to the legal requirements owing to its novelty, unobviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A switching circuit for dynamically switching a first host clock signal to a second host clock signal, the switching circuit comprising:
   an adjustment unit, transmitting a first adjustment signal and a second adjustment signal;
   an oscillator, generating a fundamental clock signal;
   a first phase-locked loop, receiving the fundamental clock signal to generate the first host clock signal correspondingly according to the first adjustment signal;
   a second phase-locked loop, receiving the fundamental clock signal to generate the second host clock signal correspondingly according to the second adjustment signal;
   a switch-recording unit, transmitting a switch-recording signal according to the second adjustment signal;
   a control unit, transmitting a switch-triggering signal according to the switch-recording signal and a first control signal, the first control signal driving a central processing unit to enter a sleep state, in which a front side bus ceases to operate; and
   an output switch unit, switching the first host clock signal to the second host signal for adjusting the operating frequency of the front side bus according to the switch-triggering signal when the central processing unit enters the sleep state.

2. The switching circuit of claim 1, wherein the first control signal is transmitted by a south bridge chip for driving the central processing unit to enter a C3 state of an Advanced Configuration and Power Interface (ACPI).

3. The switching circuit of claim 1, wherein the switch-recording unit further transmitting a non-switch-recording signal to the control unit for driving the control unit not to transmit the switch-triggering signal according to a second control signal, the second control signal drives the central processing unit to quit the sleep state.

4. The switching circuit of claim 3, wherein the second control signal is transmitted by a south bridge chip for driving the central processing unit to quit a C3 state of an Advanced Configuration and Power Interface (ACPI).

5. The switching circuit of claim 1, wherein the first phase-locked loop further receives a fixed clock signal generated by a third phase-locked loop, and generates the first host clock signal according to the phase of the fixed clock signal, and the third phase-locked loop receives the fundamental clock signal to output the fixed clock signal.

6. The switching circuit of claim 1, wherein the second phase-locked loop further receives a fixed clock signal generated by a third phase-locked loop, and generates the second host clock signal according to the phase of the fixed clock signal, and the third phase-locked loop receives the fundamental clock signal to output the fixed clock signal.

7. The switching circuit of claim 1, wherein the adjustment unit can be the central processing unit, and the first adjustment signal and the second adjustment signal can be bus select signals.

8. The switching circuit of claim 1, wherein the output switch unit is a multiplexer.

9. The switching circuit of claim 1, and further comprising a input switch unit, transmitting the first adjustment signal and the second adjustment signal outputted by the adjustment unit to the first phase-locked loop and the second phase-locked loop according to the switch-triggering signal.

10. The switching circuit of claim 9, wherein the input switch unit is a demultiplexer.

11. The switching circuit of claim 1, wherein the switching circuit can be installed in a clock generator.

12. A switching method for dynamically switching a first host clock signal to a second host clock signal, the switching method comprising the steps of:
   transmitting an adjustment signal;
   receiving a fundamental clock signal to generate the second host clock signal correspondingly according to the adjustment signal;
   transmitting a switch-recording signal according to the adjustment signal;
   transmitting a switch-triggering signal according to the switch-recording signal and a first control signal and, the first control signal driving a central processing unit to enter the sleep state, in which a front side bus ceases to operate; and
   switching the first host clock signal to the second host signal for adjusting the operating frequency of the front side bus according to the switch-triggering signal when the central processing unit enters the sleep state.

13. The switching method of claim 12, wherein the adjustment signal can be a bus select signal.

14. The switching method of claim 12, wherein the first control signal drives the central processing unit to enter a C3 state of an Advanced Configuration and Power Interface (ACPI).

15. The switching method of claim 12, wherein after the step of switching the first host clock signal to the second host signal, further comprising,
   transmitting a non-switch-recording signal to stop transmitting the switch-triggering signal according to a second control signal, the second control signal driving the central processing unit to quit the sleep state.

16. The switching method of claim 15, wherein the second control signal drives the central processing unit to quit a C3 state of an Advanced Configuration and Power Interface (ACPI).

17. The switching method of claim 12, wherein in the step of receiving a fundamental clock signal to generate the second host clock signal correspondingly according to the adjustment signal, a fixed clock signal is further received and the second host clock signal is generated according to the phase of the fixed clock signal.

18. A switching method for dynamically switching host clock signals, the switching method comprising:
   providing a first host clock signal;
   providing a second host clock signal;
   transmitting a switch-triggering signal according to a first control signal, the first control signal driving a central processing unit to enter a sleep state, in which a front side bus ceases to operate; and
   switching the first host clock signal to the second host clock signal for adjusting the operating frequency of a front side bus according to the switch triggering signal when the central processing unit enters the sleep state.

19. The switching method of claim 18, wherein the sleep state is a C3 state of an Advanced Configuration and Power Interface (ACPI).

* * * * *